United States Patent [19]
Romero

[11] 4,007,970
[45] Feb. 15, 1977

[54] AIRCRAFT AUTOMATIC BRAKING SYSTEM

[75] Inventor: Ervin Gordon Romero, Seattle, Wash.

[73] Assignee: The Boeing Company, Seattle, Wash.

[22] Filed: Sept. 30, 1975

[21] Appl. No.: 618,190

[52] U.S. Cl. ............................. 303/93; 244/111; 303/20

[51] Int. Cl.² ............................................. B60T 8/02

[58] Field of Search ............... 244/111; 303/20, 21, 303/93, 96, 106, 109, 111

[56] References Cited
UNITED STATES PATENTS

| | | | |
|---|---|---|---|
| 3,917,356 | 11/1975 | Devlieg | 303/21 BE |
| 3,926,479 | 12/1975 | Bissell et al. | 244/111 X |

Primary Examiner—Stephen G. Kunin
Attorney, Agent, or Firm—Conrad O. Gardner

[57] ABSTRACT

An aircraft automatic braking system which takes into account aircraft landing characteristics including touchdown rebound performance and nose high touchdown attitude. Signals representative of a nose gear loading (e.g. a nose gear squat switch) condition are utilized to control a dual interval time delay circuit controlling disarming of the automatic braking system. Signals representative of nose wheel speed are utilized to control rate of increase of braking pressure viz. between the first and second stages of on-ramping of pressure to a preselected rate of deceleration of main landing gear wheel(s).

4 Claims, 5 Drawing Figures

AIRCRAFT AUTOMATIC BRAKING SYSTEM

This invention relates to aircraft automatic braking systems and more particularly to signal processing of nose wheel and nose gear information signal processing of nose wheel and nose gear information signals in an aircraft automatic braking system to improve system performance with respect to aircraft rebound conditions and nose high attitude conditions during landing of the aircraft.

An aircraft automatic braking system having autobrake control logic to control arm/disarm and command brake application (on-ramp) functions at touchdown is shown in U.S. Pat. No. 3,847,445 to Bissell, et. al. issued Nov. 12, 1974. The hereinafter described invention may be contrasted therewith, since providing for control of autobrake logic directed to solutions of problems arising from initial aircraft landing characteristics (e.g. touchdown rebound performance of the aircraft and nose high touchdown attitude).

It is accordingly an object of the present invention to provide dual interval time delay means for disarming of the automatic braking system in response to nose gear compression status.

It is further object of the invention to provide two stage ON RAMP pressure commands in response to nose wheel speed information signals.

It is yet another object of the present invention to provide feedback loop control means in an automatic braking system for controlling ON RAMP pressure application during automatic braking.

It is another object of the present invention to provide means in an automatic braking system responsive to nose wheel speed information signals for increasing brake pressure from an increasing rate of predetermined value (psi/sec) to an increasing rate of further predetermined value (psi/sec) in response to nose wheel speed above a predetermined threshold value (knots).

A full understanding of the invention, and of its further objects and advantages and the several unique aspects thereof will be had from the following description when taken in conjunction with the accompanying drawings in which.

Figure 1:
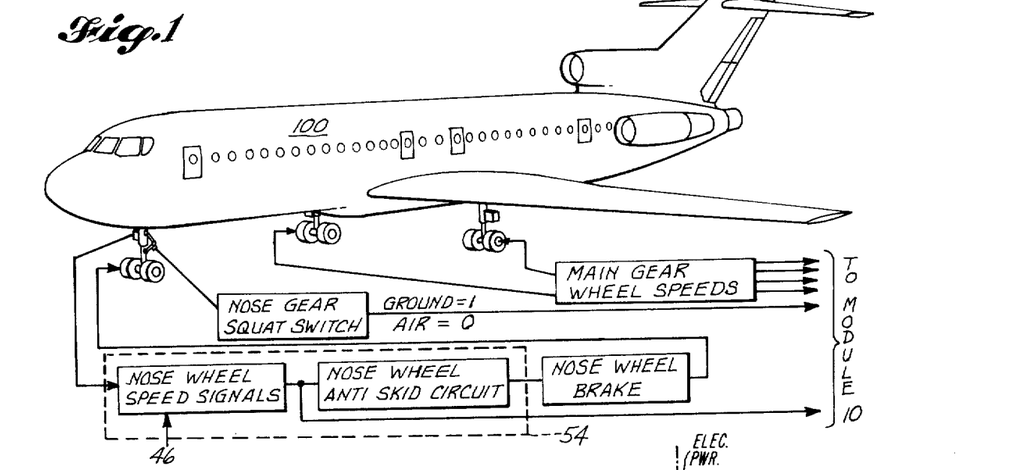
FIG. 1 is illustrative of location aboard the aircraft of sensors providing signal sources for generating signals utilized in the present automatic braking system.
Figure 2:
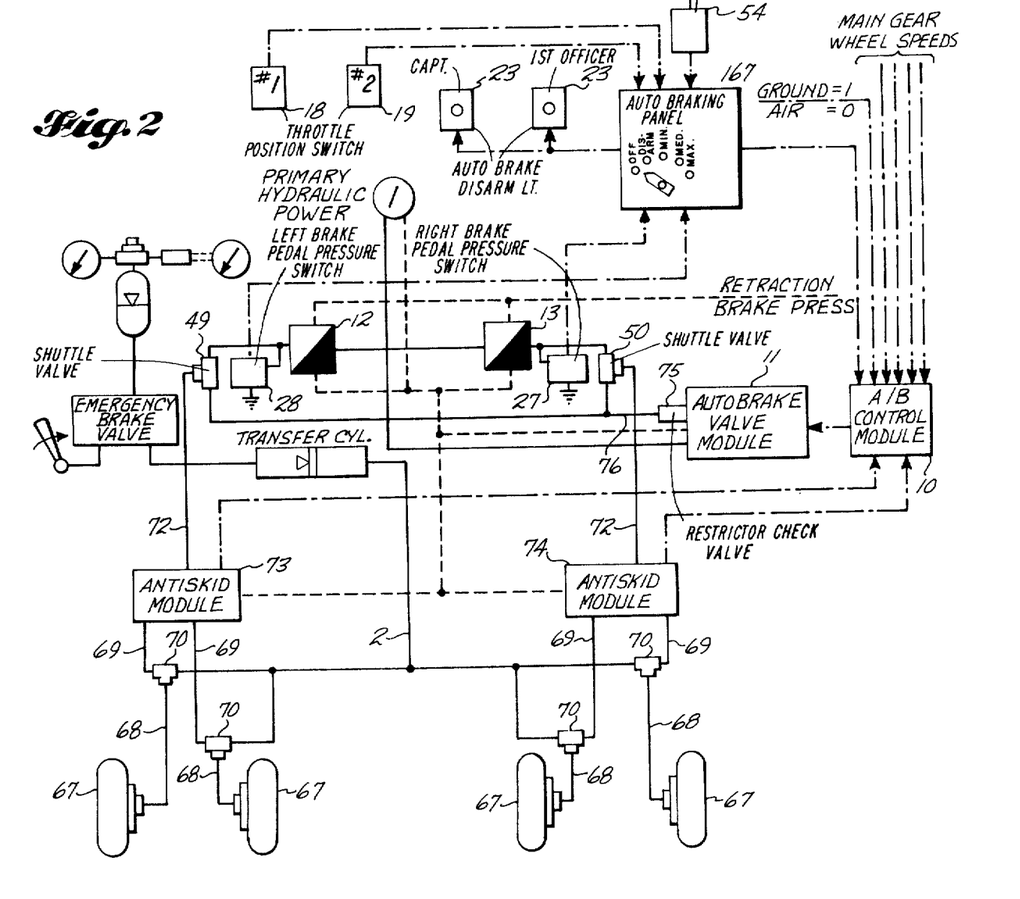
FIG. 2 is a block diagram of the present automatic braking system.
Figure 3:
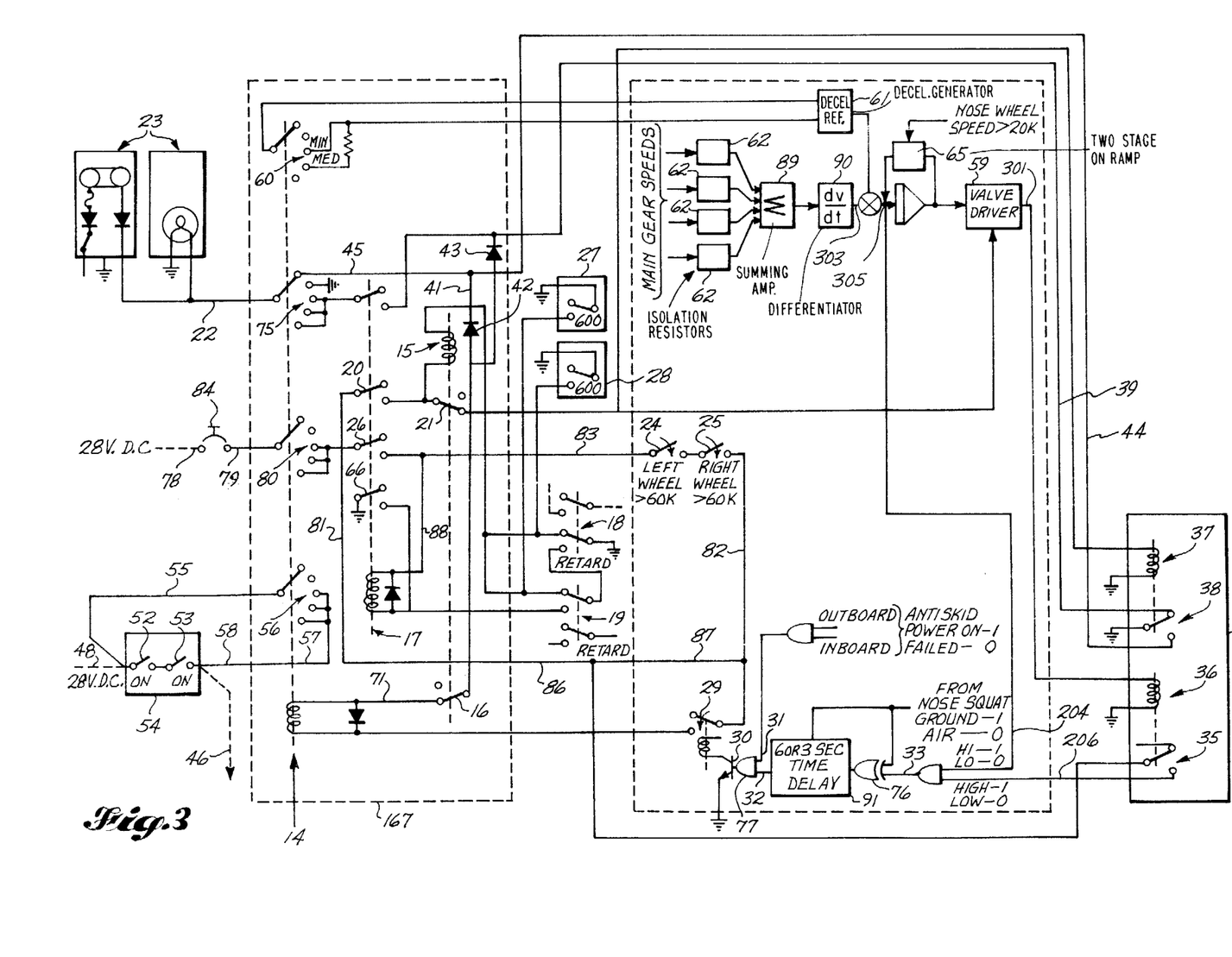
FIG. 3 is a schematic diagram of the present automatic braking system.
Figure 4:
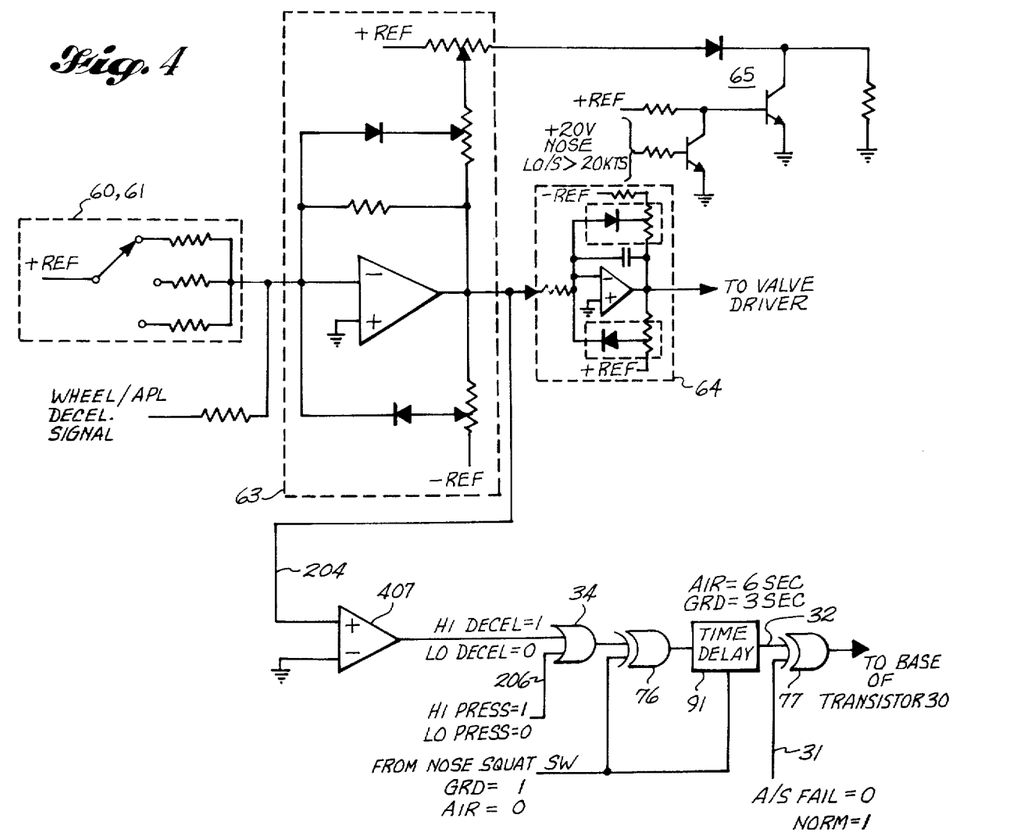
FIG. 4 is a detailed schematic diagram of a specific embodiment of a portion of the system shown in FIG. 3.

Turning now to FIG. 1, it can be seen that in an aircraft 100 equipped with known type devices, four signals representative of the four main gear wheel speeds respectively, a signal representative of nose wheel speed, and a logic signal representative of ON ground condition (predetermined voltage level, e.g. termed 1) or OFF ground condition (voltage level less than said predetermined voltage level, e.g. 0) are provided for use downstream in the present automatic braking system described in more detail hereinafter in connection with the description of FIGS. 2, 3 and 4.

Turning now to the hydraulic and electrical block diagram of FIG. 2 and following description believed helpful in gaining a basic understanding of system operation, it will be observed that four multi-disk, hydraulically operated braked wheels 67 are shown, said wheels suported in known manner from a pair of main landing gear (as seen in FIG. 1). In FIG. 2, the symbol (----) is representative of hydraulic return lines, the symbol (-.-.) is representative of electrical conductors, and the solid straight lines are representative of hydraulic pressure lines. Pressurized hydraulic fluid is normally supplied through lines 69, shuttle valves 70, then lines 68 to brakes of wheels 67. Shuttle valves 70 are shown for completeness only since not involved in autobraking but, however, serve the purpose of admitting emergency system brake pressure downstream through line 2 and shuttle valves 70 to the brakes of wheels 67. For ease in understanding the hydraulic aspects of the system of FIG. 2, FIG. 1 of aforementioned U.S. Pat. No. 3,847,445 to Bissell et al. should be turned to and upon a comparison thereof with the instant FIG. 2 system, it will be noted that the present autobrake valve module 11 corresponds to valve means 35 of Bissell et al. Shuttle valves 49 and 50 of the present FIG. 2 correspond to shuttle valves 40 and 41 respectively in Bissell et al and provide the same function in the system viz. sense the higher of metered pressure or autobrake valve pressure, transmitting the greater pressure to the anti-skid valves. In this connection, in FIG. 2 of the present application, antiskid modules 73 and 74 respectively include antiskid control circuit 50 and antiskid valve 42, and antiskid control circuit 51 and antiskid valve 48 respectively. While a four wheel embodiment is shown in the present FIG. 2 system, and a two wheel embodiment is shown in the FIGURE embodiment of Bissell et al., FIG. 2, 3 or 4 multiwheel embodiments of Bissell et al. could be substituted for the four wheel embodiment in the present FIG. 2 system. Pilot operated brake pedal controlled metering valves 12 and 13 of the present FIG. 2 system correspond respectively to metering valves 33 and 34 of the FIG. 1 Bissell et al. system. The present system in summarizing differs primarily from the Bissell et al. system of FIG. 1 in terms of system control logic 13 and nature of automatic brake pressure control signals coupled to automatic braking pressure modulating valve means 37 as hereinafter described in detail, more particularly in connection with the description of the detailed schematic shown in FIG. 4 of the present application.

Continuing now in more detail with the description of the FIG. 1 block diagram of the present system, it will be noted that antiskid modules 73 and 74, previously discussed, regulate the pressure delivered to the brakes whenever the pressure transmitted to the modules by respective lines 72 from corresponding metering valves 12 and 13 or autobrake valve module 11, described hereinafter in detail, exceeds values which will cause wheel skidding. Shuttle valves 49 and 50 (corresponding to shuttle valves 40 and 41 of FIG. 1 in Bissell et al.) sense which source, metering valves 12 and 13 or autobrake valve module 11, is delivering the greater pressure and direct the greater pressure to antiskid modules 73 and 74. Pilot operated brake pedal controlled metering valves 12 and 13 permit the pilot to assume brake control if he chooses to manually apply more pressure than that being supplied by the automatic braking function. In passing and as described hereinafter in more detail, it should be noted that other means of control besides manual brake pressure application are provided for brake control. Autobrake valve module 11, autobrake control module 10, antiskid modules 73 and 74, autobraking panel 167, and antiskid control panel 54 include circuits and/or devices shown grouped together (shown in more detail in FIG. 3) at various locations, e.g. at a panel in the cockpit. However, it should be noted in passing that the exact location of all such circuits or devices is not required to be behind a certain panel or in a given module at a particular location. In FIG. 1, autobrake valve module 11 is shown responsive to signals provided by autobrake (A/B) control module 10, which module 10 is responsive to signals from antiskid modules 73 and 74 and signals from autobraking panel 167 in a manner detailed hereinafter.

Autobraking panel 167 is responsive to advance of throttle representative logic signals provided by thrust lever switches 18 and 19 for preventing automatic brake pressure application unless the throttles are retarded. Brake pressure switches 27 and 28 sense pressures metered to the brakes by respective pedal operated metering valves 12 and 13. Panel 167 is responsive to logic signals provided by switches 27 and 28 and provides automatic braking system disarming when metered pressure from either of valves 12 and 13 or both exceed a predetermined level (e.g. 600 psi). Panel 167 is further responsive to nose wheel speed signals obtained from antiskid control panel 54 since, as mentioned earlier, present system autobraking is a function of nose wheel speed and is readily obtainable from the nose wheel antiskid system in aircraft having nose wheel antiskid otherwise from an added nose wheel speed transducer and circuit for providing nose wheel speed signals. Autobraking panel 167 utilizes control circuitry (as seen and hereinafter described with reference to FIG. 3) which assures transmission of signals representative of nose wheel speed when nose wheel brakes are not being used along with main wheel brakes; also, circuitry associated with panel 167 provides means for preventing nose gear wheel brake utilization unless main gear wheel brakes are also being utilized. Deceleration level selecting switch means 14 is set manually by the pilot to provide a rate of deceleration of the aircraft which is maintained at a constant level by the automatic braking system in spite of factors influencing aircraft deceleration such as utilization of thrust reversers and changing head winds. Note also in the system of FIG. 1 of the aforementioned Bissell et al. patent that a decel select switch is provided at 14. Switching means 14 has five positions, viz. OFF, DISARM, MIN (e.g. minimum rate of 5 ft sec$^2$), MED (e.g. medium rate of 7 ft sec$^2$), and MAX (e.g. maximum rate of 10 ft sec$^2$). Positioning switching means 14 in any of the three deceleration select positions (MIN, MED, or MAX) arms the automatic braking system and the system will function to provide the selected deceleration when certain other conditions affecting the control logic are satisfied as hereinafter described. When certain logic conditions are not satisfied, the system is disarmed and switching means 14 is driven to the DISARM position by system logic control circuitry also resulting in the energization and consequent illumination of warning lamps 23 thereby indicating that the system is disarmed and inoperative. Lamps 23 are also connected in the system (as explained in connection with the description of FIG. 3) in a manner so that they are also indicative of certain actual failure conditions in system hardware (e.g. presence of hydraulic pressure at main gear wheel brakes when the automatic braking system is not in an armed condition or absence of such pressure when the system is providing a pressure command).

Turning now to FIG. 3, it will be first observed that the signal control channel for providing the brake pressure control signal to the valve driver is shown in block diagram while the remaining logic control for providing disarm and other overall system control functions is shown in more detail. This has been done to provide the reader with a closer understanding of the similarities and differences between that portion of the system which generates the brake pressure control signals and the manner in which such signals are provided in the above referenced Bissell et al. patent. FIG. 4 hereinafter described will provide circuit schematic details of the autobrake control module 10 portion of the system of FIG. 3, especially the feedback control utilized in the signal control channel for providing brake pressure control signals, and certain logic and delay circuitry for providing further control of brake pressure control signals.

In the system as shown in FIG. 3, to use automatic braking, the captain (or first officer) manually switches automatic braking switching means 14 (a ganged stack of single pole, four position switches) from the OFF position to the deceleration level he will desire during the landing, e.g. MIN, MED, or MAX. This action arms the system. Switch 14 is a latching type switch and moves to the DISARM position when it is unlatched. Unlatching occurs under each of the following conditions:

1. autobrake disarm relay 15 is energized thereby opening switch 16 (shown in the closed position) disposed in series circuit with ground conductor 71 for the latching coil of switching means 14.

2. power to the latching coil is interrupted by closure of switch 29 (shown in the open position) because logical conditions (hereinafter detailed) are not met.

Immediate return of switching means 14 to the DISARM position after manual setting thereof to a selected deceleration indicates automatic braking system inoperative (for reasons hereinafter given).

The automatic braking system when armed will not operate to provide automatic braking until the energizing coil of relay 17 is energized closing the four single pole, two position switches (shown in the open position). The relay coil of relay 17 becomes energized only under the following conditions:

1. The system has been armed.

2. Two throttles are retarded (by closing of switches 18 and 19 to RETARD position).

3. One wheel on each main landing gear has reached a wheel speed of 60 knots (by closure of switches 24 and 25).

4. Pressure from each of the brake pedal operated metering valves is less than 600 psi (switches 27 and 28 remain open).

5. The antiskid system is operative (inboard and outboard antiskid system power is ON as represented by the presence of an ON logic signal 31 input to AND circuit 77), pressure is available to the automatic braking system, pressure monitoring is satisfied, the servo valve for metering automatic braking pressure is functioning properly, and the aircraft is on the ground.

Once relay 17 has been energized, the energizing coil of relay 17 is provided with its own ground circuit path through switch 66 for maintaining relay 17 energized and the four switches of relay 17 closed even though left and/or right main landing gear (represented by closed switches 24 and 25) drop below 60 knots (and switches 24 and/or 25 open). Relay 17 then remains energized until power to the automatic braking system is shut off manually by the operator or by disarming because one or more of the preceding five conditions (except condition 3) is not satisfied.

With regard to condition (1), as mentioned previously, the automatic braking system is armed when automatic braking deceleration select switching means 14 is manually positioned to one of the three deceleration level positions. Resetting switching means 14 to DISARM or OFF will disarm the system and also shut the system off if it is operating in an automatic braking mode.

With regard to condition (2), it should be noted that retard in throttle positioning is sensed by closure of throttle retard position sensing switches 18 and 19 associated with two of the three engine type aircraft shown (in FIG. 1), more than one throttle position sensing switch being provided for reducing purposes. If both throttles are retarded, the energizing coil of relay 17 is provided with a ground circuit path thereby remaining energized to maintain the four switching paths dependent thereon closed until self-contained grounding circuit through switch 66 is closed. If the throttles are advanced at a time when the system is to be deployed (by positioning of switching means 14), there will be no ground path to energize the coil in relay 17 and relay 17 will remain open so that there is no closure of the four circuit paths enabled by the four switches driven by the relay. With relay 17 not energized, 28 volt D.C. power will not be provided through conductor 79 and switch 80 to power the automatic braking pressure control signal channel at valve driver circuit 59, to the relay coil of relay 17 itself, or to power the wheelspeed sensing circuits and provide signals representative of wheelspeed > 60 knots of the left and right main gear wheels so that switches 24 and 25 can be closed. Also, the self grounding function of relay 17 through switch 66 will not take place since switch 66 remains open. Also, if relay 17 had been energized before the throttles were advanced, when the throttles are advanced, the throttle switches 18 and 19 would have provided a circuit path to ground for the energizing coil if automatic braking system disarm relay 15 through switch 20 resulting in opening of switch contact 16 of relay 15 thereby further resulting in unlatching of switching means 14 which switching means 14 returns to the DISARM position thereby causing a circuit ground of conductor 22 to warning lights 23 resulting in their illumination representative of autobraking system DISARM, and switch 80 removes power from switch 26 and 88 de-energizing relay 17.

With regard to condition 3, power to energize relay 17 thereby resulting in closure of switch 20 and power application to the system cannot reach the energizing coil of relay 17 until both switches 24 and 25 are closed. If switches 24 and 25 are closed (and other conditions are satisfied), D.C. power reaches the coil or relay 17 through the circuit path comprising conductor 78, circuit breaker 84, conductor 79, switch 80 of switching means 14, conductors 85, 81, 86, 87, 82, switches 24 and 25 and conductors 83 and 88. Activation of relay 17 causes application of D.C. power to the automatic braking system through switch 20, provides self-grounding of the energizing coil of relay 17 through switch 66, also causes coupling of D.C. power to energizing coil of relay 17 through switch 26 thereby closing switch 66. With switches 66 and 20 in a closed condition, (for reasons hereinafter explained) wheelspeed (s) as represented by closing of switches 24 and/or 25 can drop below 60 knots thereby opening switch(es) without discontinuing autobraking system function in the autobrake mode. Wheelspeed switches 24 and 25 are acutated (to a closed position) when D.C. wheelspeed representative signals exceed a predetermined voltage representative of a predetermined wheelspeed (60 knots in the presently described embodiment). These D.C. wheelspeed signals may be obtained from wheelspeed convertors in antiskid systems commonly used on the main gear wheels.

Regarding condition 4, it should be noted from FIG. 3 and FIG. 1 that switches 27 and 28 are pressure operated switches installed respectively on the output lines of pedal operated pressure metering valves 12 and 13 (see FIG. 1). When the metered pressure exceeds a predetermined level (here shown as 600 psi) on either left or right or both metering valves, normally open switches 27 and 28 close thereby providing a ground circuit path for autobrake disarm relay 15. If the system is in the autobraking mode of operation (with automatic brake control of the main landing gear wheels available), providing a ground circuit path for autobrake disarm relay 15 will shut the automatic braking system off and cause movement of latching switch means 14 to DISARM in the manner previously explained in connection with the description of autobrake disarm relay 15 function in the system. If the system is not in an autobrake mode and an attempt is made by the operator to operate it, e.g. satisfy five conditions to energize relay 17, while at least one of the brake metered pressures exceed 600 psi, the system will immediately shut off and switching means 14 revert to DISARM position (under lack of power to the energizing coil of switching means 14).

It should be noted that pedal operation will not disarm the system if the system is not yet functioning in an autobrake mode. Although the energizing coil of relay 15 would be provided with a circuit path to ground there would be no energizing D.C. power supplied to the coil through switch 20 if the system is not functioning on the autobrake mode (relay 17 energized and switch 20 closed).

With regard to condition 5, switching means comprising relay 29 providing a system disarm function is required to be closed for system operation. Energization of the coil of relay 29 to close the circuit path is provided when a logic ON signal is present at the base of transistor 30. If no ON signal is present at both inputs (31 and 32) to AND circuit 77, then transistor 30 is turned off and the coil of relay 29 does not close switch 29. If either inboard or outboard antiskid systems are shut off purposely or have failed, and AND circuit 181 will not provide an output ON signal at 31. An air/ground signal derived from the nose gear squat switch (zero level representative signal providing an OFF signal repesentative of nose wheel in the air) and (predetermined voltage level greater than zero repesentative signal indicated in the drawings as 1 providing an ON signal representative of nose wheel on the ground) is utilized to control time delay circuit 91 (e.g. a high output from 76 removes ON signal 32 after time delay) provide a delay of 6 seconds in the event of air mode and three seconds in the event of ground mode. The nose gear squat switch logic signal is also provided as an input to EXCLUSIVE OR circuit 76.

An OFF signal (termed 0 in the drawing) 32 will occur as an input to AND circuit 77 after a 6 second time delay under conditions hereinafter described since an OFF signal (representative of nose wheel off the ground or nose gear squat switch not closed) is controlling time delay circuit 91 and such OFF signal (representative of nose wheel off the ground or nose gear sqat switch not closed) is also provided as an input to EXCLUSIVE OR circuit 76. As a result of OFF signal 32 being provided in the above circumstances as in input to AND circuit 77 when the nose gear squat switch is open, an OFF signal is provided at the output of AND circuit 77 turning off transistor 30 thereby opening the relay 29 coil circuit path to ground and interrupting power to the energizing coil of latchig switch means 14 thereby spring driving switching means 14 to the DISARM position.

Time delay circuit 91 is switched under control of the nose gear squat switch logic input signal to provide a six second time delay if the system is beginning to function in an autobrake mode subsequent to the main gear wheels exceeding a wheelspeed of 60 knots although the nose wheel has not touched down.

With nose squat on the ground, an ON signal 33 must be present at the output of AND gate 34 in order to maintain an ON signal at 32. The logical inputs to OR circuit 34 comprise (1) an ON or OFF (hl=1 or LO=0 drawing legends) signal 204 representative of a high or low rate of aircraft deceleration (such type signal termed DECEL monitor from 71 was used as an input to circuit 118 in FIG. 10 of the aforementioned Bissell et al. patent), and (2) an ON or OFF (H1=1 or L0=0 drawing legends) signal 206 representative of high or low servo valve pressure provided by pressure sensing switch 35 which is connected to the output of servo valve 36. Servo valve 36 herein corresponds to valve 37 in autobrake valve module 35 of FIG. 1 of the aforementioned Bissell et al. patent, solenoid valve 37 herein corresponding to solenoid valve 36 therein. It can be observed from the preceding that an OFF signal at 33 will occur unless either ON signal is present at the input of OR circuit 34 resulting in opening of switch 20 and consequent DISARM of the system. Presence of the two OFF signal inputs to OR circuit 34 is indicative of a hydraulic failure, i.e. the conditions together of low servo valve pressure and low airplane deceleration. If either condition occurs, opening of switch 29 results with consequent interruption of power to the holding coil of latching switching means 14 and consequent DISARM thereof and interruption of power to the autobrake system also resulting in a ground circuit path for disarm warning lights 23 to further signal a system inoperative condition.

When power is applied to the present automatic braking system through switches 80, 20 and 21, valve driver circuit 59 (corresponding to circuit 26 of the aforementioned Bissell et al. patent) is energized, and solenoid valve 37 (corresponding to solenoid 36 in the aforementioned Bissell et al. patent) is energized to an open condition thereby providing full system pressure to servo valve 36 (which corresponds to valve 37 of Bissell et al.). Solenoid valve pressure switch 38 is responsive to the output pressure of solenoid valve 37 and when the output pressure exceeds a predetermined level (600 psi, as shown) provides a circuit path to ground for the holding coil of latching switch 14 through conductor 44, diode 42, conductor 40 and switch 16. When solenoid valve pressure switch 38 is in the low pressure position (as shown in the Figure for less then 1000psi) it also provides a ground circuit path for the holding coil via conductor 39, diode 43, conductor 40 and switch 16 thereby keeping the system armed but at the same time providing a ground circuit return path for autobrake disarm lights 23 via conductor 39 and relay 17 energized to indicate the automatic braking system is not in proper condition for operation due to (1) solenoid valve pressure switch 37 failure, or (2) solenoid valve 36 failure, or (3) system hydraulic power failure. Also, if the automatic braking system is OFF (at switch 14) but failures cause solenoid valve pressure sensing switch 38 to switch to high pressure condition, a ground circuit path to autobrake disarm light(s) 23 is provided via conductors 44, 45, switch 75 and conductor 22 thus signaling the failure(s).

The present system may be utilized in aircraft having nose wheel brakes. It is necessary as described in the preceding to develop signals representative of nose wheel speed for utilization in the present system, whether or not the nose gear antiskid system is switched on. As a consequence, such wheel speed signals are provided in the present system in the following manner:

Conductor 46 transmits power to the nose wheel speed sensors (see FIG. 1) so that nose wheel speed signals are generated. Normally, power reaches conductor 46 through switches 52 and 53 of antiskid control panel 54. Switch 52 turns the nose gear antiskid system on and off, and switch 53 is actuated by main gear antiskid switch, such switch arrangement assuring that nose gear antiskid cannot be used uless the main gear anitskid is used at the same time. In order in the present system to provide power to the nose wheel speed sensors when the nose gear antiskid is not turned on, a conductor 55 is connected from the D.C. power source to switch 56 of arming switching means 14 so that when the switch 14 is in one of the armed positions, power is always transmitted to conductor 57 and the power conductor 46 for energizing the nose wheel speed sensing system to provide the signals representative of nose wheel speed.

Turning now the signal control channel portion of the system of FIG. 3 and comparing the present system with the system of FIG. 1 shown in Bissell et al., U.S. Pat. no. 3,847,445, referred to previously, certain similarities will be noted, more particularly in the manner of generating output signal 301 from valve driver circuit 59 (corresponding to signal 74 of valve driver circuit 26 of Bissell et al.). A deceleration level signal is provided by switch 60 in conjunction with a resistor network termed reference deceleration signal generator circuit 61. This signal is in the form of an electrical current and is compared with a signal proportional to aircraft deceleration, the difference (error) between these two signals being utilized to automatic braking system servo valve so that braking is adjusted to keep the error small. The preceding system philosophy is similar in both systems, however the present system will now be detailed so that the points of clear departure from Bissell et al. will become fully appreciated.

As noted from FIG. 3, the deceleration level signal has three possible values corresponding to the minimumm, medium, and maximum deceleration rates selectable manually by the pilot by autobrake switch 14 positioning. The deceleration signal representative of rate of deceleration of the aircraft is derived from the main gear wheel speed signal generators (transducers) already present in the antiskid system. These transducers, well known to those skilled in the art, produce a pulsed signal, the frequency of which varies in proportion to wheel speed. These pulsed signals are fed to converters 62 for each of the four main gear wheels which converters 62 in turn provide D.C. signals having voltages proportional to pulsed input frequency and speed. These signals from converters 62 are averaged at 89 and the signal representative of average wheel speed is differentiated at 90 to provide a signal 303 representative of average deceleration of the main gear wheels (corresponding to signal 56 of FIG. 1 of Bissell et al. and termed WHEEL/AIRPLANE DECEL SIGNAL therein and also herein in FIG. 4). The signals representative of reference and aircraft rate of deceleration are coupled to summing circuit means 63 (corresponding to summing circuit 18 of Bissell et al)., to provide the error signal 305. Error signal 305 is integrated at 64 (corresponding to circuit 22 of FIG. 1 of Bissell et al.) and coupled to valve driver circuit 59 (corresponding to power amplifier circuit 26 of Bissell et al.). Voltage clamps in the integrator (as seen in more detail in FIG. 4) circuit 64 limit the output error signal to the equivalent of ±1 ft./sec. acceleration or deceleration.

Turning now to a key departure from Bissell et al., it will be seen as shown in block form (and later in detail in the schematic of FIG. 4) that the rate at which error signal output from integrator circuit 64 can increase in a particular manner is controlled by the present specific type circuitry and ON RAMP feedback loop 65. This feedback loop limits the signal so that brake pressure cannot increase faster than a first predetermined rate, e.g. about 150 psi/second until the signal representative of nose wheel speed exceeds a predetermined wheel speed, e.g. about 20 knots. When the aforementioned predetermined nose wheel speed is reached, the ON RAMP or rate of increasing brake pressure is adjusted to limit rate of increase to a second predetermined rate (e.g. about 1300 psi/second) greater than said first predetermined rate. The present dual rate ON RAMP for applying brake pressure during landing prior to reaching a constant rate of acceleration of the aircraft, shown in more detail in FIG. 4, is a significant departure from and not found in the system of Bissell et al., and makes allowance for different problems incuding aircraft having a characteristically nose-high touchdown attitude. The present system provision for slow rate of brake pressure increase while the nose wheel is still not in contact with the ground permits stopping of the aircraft to commence as soon as main gear wheels are in firm contact with the ground, but not with sufficient force to cause the aircraft to pitch down excessively rapidly and forcefully on the nose wheels.

Also, from the preceding, the function of dual time delay in the logic circuitry in accomodating rebound conditions is believed clear. In a no-rebound landing, the nose gear will be on the ground within the shorter delay time and the system will have stabilized before the end of this shorter delay time allowing certain logic conditions enumerated earlier to be satisfied so that system disarming is not initiated through opening of relay controlled switch 29.

Figure 5:
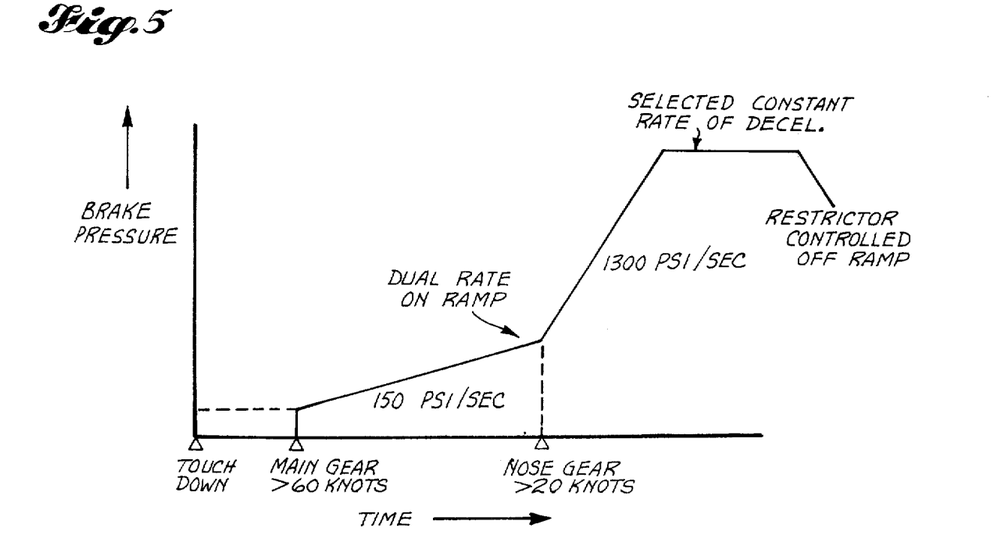
FIG. 5 is a plot of brake pressure versus time for a typical application of brakes in the automatic braking system of FIG. 3.

In the event of a rebound, the sequence of events is as follows:

As seen in FIG. 5, at the initial touchdown the main gear wheel speeds exceed 60 knots and the system is thereby actuated causing brake pressure application to increase; however, even if the main gear wheels leave the ground and therefore decelerate rapidly even though applied brake pressure is still low because of the low rate of increase of brake pressure permitted with nose gear off the ground and zero nose wheel speed controlling in the region of low ON RAMP brake pressure application. Such high deceleration of main gear wheels (indicated by an ON or 1 signal at 204) under this condition with low brake pressure application (indicated by an OFF or 0 signal at 206) sensed by switch 35 is indicative of a failure condition which would disarm the system through AND gate 34 which would provide an OFF signal at 33 resulting further downstream in the opening of switch 29 resulting in disarming of the system. However, because the nose gear is not firmly on the ground (air mode), the longer time delay (e.g. about 6 seconds) prevails which permits the aircraft to settle to the ground again without the system being disarmed and shut off. In the interval of the longer delay (e.g. about 6 seconds) brake pressure will (because of the low rate of pressure increases) have increased to 900 to 1000 psi, an acceptable level for second contact of the main gear wheels with the ground and assuring for further immediate initiation of deceleration made more necessary by the runway distance already not utilized to decelerate the aircraft during the rebound.

Various failure indicating features inherent in the system will now be reviewed and include the following:

a. When the system is armed by setting of autobraking switch 14, if it does not latch in one of the three deceleration positions selected, there is indication of a faulty inoperative system and switch 14 moves to the DISARM position and disarm lights 23 are illuminated indicating to the pilots that an automatic braking mode is not available.

b. If system switch 14 is in the OFF position, failure of solenoid valve 37 which would port system pressure to the brakes when it should not occur would be indicated when pressure sensing switch 38 moves to the pressure on position (exceeds 1000 psi) thereby providing a ground circuit path for disarm lights 23 via conductors 44 and 45, switch 75 and conductor 22.

c. Failure of commanded pressure to be applied to the brakes when the system is in an operational autobrake mode is indicated by an interruption of the presence of an ON signal (representative of high pressure) to OR gate 34 and a LOW signal input in lieu thereof to OR gate 34, and (2) since there is insufficient pressure, an OFF signal (representative of LO-decel) is also inputted to OR gate 34. Since both inputs to OR gate 34 are OFF, there is an OFF signal at 33 as an input to EXCLUSIVE OR circuit 76, and EXCLUSIVE OR circuit 76 can provide input to delay circuit 91 with an ON, e.g. nose squat on ground signal at the other input of EXCLUSIVE OR circuit 76, which removes ON signal 32 after a 3 second time delay.

If the nose gear is on the ground and an ON signal is controlling time delay circuit 91 (to the shorter time interval), the ON signal, if present at the output of 91, is interrupted after the short interval from being coupled as an input to AND gate 77 thereby interrupting the ON condition of transistor 30 causing switch 29 to open and unlatching switch 14 causing it to move to DISARM position also further providing a circuit path to ground for DISARM lights 23 via switch 75 of switching means 14 and conductor 22.

Turning now to FIG. 4, there will be seen a detailed circuit schematic (using the same reference numerals) of the feedback loop 65 earlier described in connection with the description of FIG. 3. The similarities therein with the FIG. 1 system circuitry and signals of Bissell et al. will be noted, viz. circuits 63 and 64 correspond to circuits 18 and 22 thereof and for reference to more detailed circuit operation thereof, the description in Bissell et al. may be studied and is incorporated herein by reference. The remaining logic circuitry controlling the turning on and off of transistor 30 has been explained in the earlier discussion with respect to FIG. 3, it should be noted in passing also that the wheel/airplane decel signal 204 is converted to a logic ON or OFF signal by reference to threshold potential at differential amplifier which provides a HI DECEL representative ON logic signal when the rate of deceleration equals or exceeds a predetermined value, e.g. 5, 7 or 10 ft/sec$^2$.

While, FIG. 5 has been referred to earlier, it should be noted that a time wise pressure profile subsequent to touchdown showing main gear wheel speed initiation of autobrakes to a first ON RAMP pressure rate is illustrated. Further ON RAMP brake pressure application is shown at a greater rate than the first ON RAMP rate, initiated by nose gear wheel speed greater than a predetermined value, e.g. about 20 knots until the commanded rate of constant deceleration of the aircraft is achieved followed by an OFF RAMP rate of pressure decrease initiated by autobrake OFF switch positioning of switching means 14 which OFF RAMP rate of pressure decrease is controlled by restrictor check valve 75 in hydraulic line 76.

I claim:

1. The method of braking a first wheel on a main landing gear on a first side of a plane passing through the fuselage of an aircraft having a nose gear and a second wheel on a main landing gear on the remaining side of said plane comprising the following steps:
   measuring the wheel speeds of said first and second wheels;
   applying braking pressure to said first and second wheels at an increasing rate of less than a predetermined value after said wheel speeds of said first and second wheels exceed a predetermined wheel spaced value;
   measuring the wheel speed of a wheel on said nose gear of the aircraft;
   applying braking pressure to said first and second wheels at an increasing rate of less than a further predetermined value after said wheelspeed of said wheel on the nose gear of the aircraft exceeds a predetermined value until the rate of deceleration of said aircraft equals a predetermined rate of deceleration, said further predetermined value being greater than said increasing rate of less than a predetermined value; and then,
   adjusting braking pressure to said first and second wheels to maintain constant said predetermined rate of deceleration of said aircraft.

2. In combination of an aircraft, an automatic braking system having system arming and disarming switching means for automatically controlling the application of braking pressure to a plurality of wheels of the aircraft upon touchdown of the aircraft:
   nose gear squat switch means for providing a signal representative of aircraft status with respect to the ground;
   first circuit means for providing a first time delay having a first predetermined value when said signal representative of aircraft status is indicative of an air mode, and a second time delay having a second predetermined value less than said first predetermined value when said signal representative of aircraft status is indicative of a ground mode; and,
   seond circuit means coupled between said first circut means and said system arming and disarming switching means for disarming said automatic braking system upon the occurrence of said first time delay and permitting disarming of said automatic braking system upon the occurrence of said second time delay.

3. In combination in an aircraft having a nose gear wheel and a plurality of landing gear wheels, an automatic brake control system comprising:
   first means for generating signals representative of the wheel speeds of said plurality of landing gear wheels;
   second means for generating signals representative of the wheel speed of said nose gear wheel;
   an automatic brake logic circuit coupled to third means;
   valve means for controlling brake pressure application to said plurality of landing gear wheels;
   third means coupled between said first means for generating signals representative of the wheel speeds of said plurality of landing gear wheels and said valve means for generating brake control signals to increase brake pressure and decelerate said plurality of landing gear wheels to one of a plurality of manually selectable deceleration rates when an enabling condition of said automatic brake logic circuit is satisfied; and,
   said third means including means responsive to said second means for limiting the rate of increase of brake pressure application to a first predetermined rate when said signals representative of the wheel speed of said nose gear are less than a predetermined wheel speed value and limiting the rate of increase of brake pressure application to a second predetermined rate greater than said first predetermined rate when said signals representative of the wheel speed of said nose gear exceed said predetermined wheel speed value.

4. In combination in an aircraft having an automatic wheel brake control system:
   first means for generating signals representative of wheel speed;
   valve means for controlling brake pressure application,
   an automatic brake logic circuit;
   second means coupled between said first means and said valve means for generating brake control signals to increase brake pressure and decelerate the wheel to one of a plurality of manually selectable constant deceleration rates in response to wheel spin-up from substantially zero wheel speed to a predetermined wheel speed velocity when said automatic brake logic is satisfied;
   third means for providing a signal representative of the air-ground mode of operation of the aircraft; and, said automatic brake logic circuit coupled between said third means and said second means, said automatic brake logic circuit responsive to said third means for disarming said automatic wheel brake control system subsequent to a first predetermined time period in response to a signal representative of the air mode of operation of the aircraft and preventing disarming of said automatic wheel brake control system to enable said automatic brake logic to be satisfied during a second predetermined time period of shorter duration than said first predetermined time period in response to a signal representative of the ground mode of operation of the aircraft.

* * * * *